United States Patent [19]
Shirasaki

[11] Patent Number: 4,747,655
[45] Date of Patent: May 31, 1988

[54] OPTICAL WAVELENGTH COMPOUNDING/DIVIDING DEVICE

[75] Inventor: Masataka Shirasaki, Tokyo, Japan

[73] Assignee: Fujitsu Limited, Kawasaki, Japan

[21] Appl. No.: 8,346

[22] Filed: Jan. 29, 1987

[30] Foreign Application Data

Jan. 30, 1986 [JP] Japan ............... 61-018627
Jan. 30, 1986 [JP] Japan ............... 61-018633

[51] Int. Cl.$^4$ .................................. G02B 6/34
[52] U.S. Cl. .................. 350/96.19; 350/96.15; 350/96.16; 370/1
[58] Field of Search ............... 350/96.15, 96.16, 96.18, 350/96.19, 162.2, 162.21, 162.22, 162.23; 370/1, 2

[56] References Cited

FOREIGN PATENT DOCUMENTS 0031027 7/1981 European Pat. Off. ......... 350/96.19
0196948 10/1986 European Pat. Off. ......... 350/96.19
60-107004 6/1985 Japan .

OTHER PUBLICATIONS

I. Nishi, et al., Electronics Letters 21,10, pp. 423,424 (1985).

Primary Examiner—John Lee
Assistant Examiner—John Ngo
Attorney, Agent, or Firm—Staas & Halsey

[57] ABSTRACT

An optical device is provided for dividing light depending on an optical wavelength thereof. The device includes a single input optical fiber and an output fiber array consisting of a plurality of optical fibers, and spectroscopic grating and a tetrahedral dispersion-dividing prism disposed on an optical path between the input and the output fibers. The prism has a face defining a dispersion-dividing part consisting of a plurality of step-like V-shaped grooves each having an apex with an angle of 60° and two inclined surfaces, so that a light beam, the position of which is shifted depending on the wavelength thereof, hits the grooved face, and within the region of one groove, the light beam is reflected first at one of the inclined surfaces and then reflected at the other surface so as to change the direction of the light beam.

8 Claims, 6 Drawing Sheets

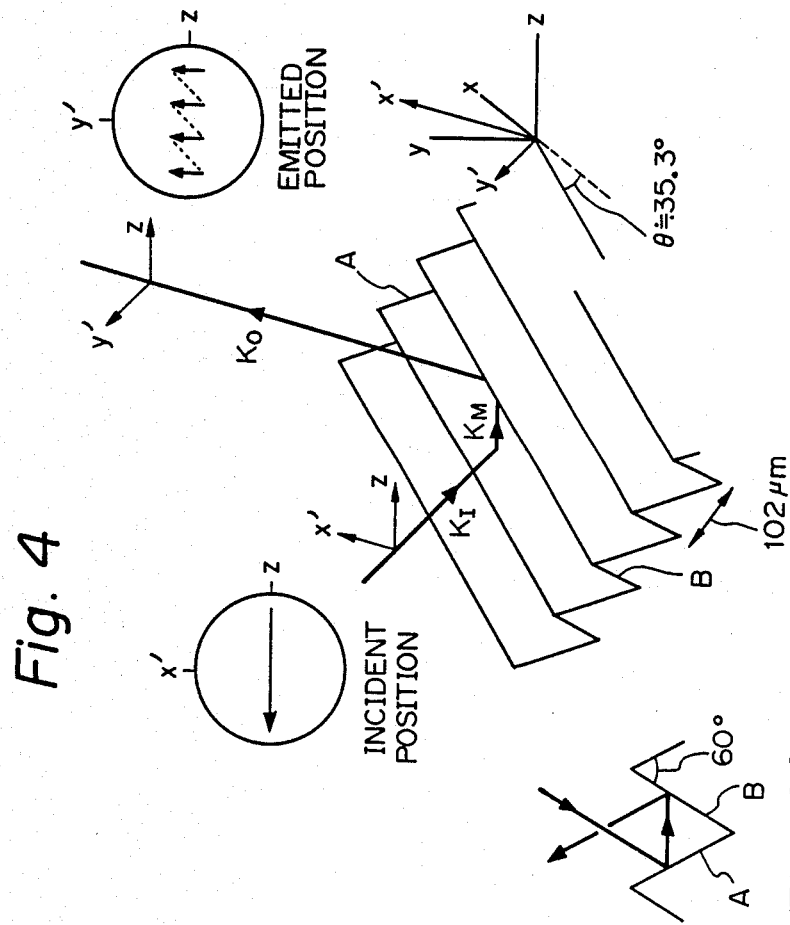

x: INCIDENT POSITION

OPTICAL WAVELENGTH COMPOUNDING/DIVIDING DEVICE

BACKGROUND OF THE INVENTION

1. Field of the Invention

This invention relates to an optical communication system, and more particularly, to a device (multiplexer/demultiplexer) for compounding/dividing light depending on an optical wavelength.

In an optical wavelength multiplex communication, a plurality of light beams having different wavelengths (respective wavelength channels) which communicate a plurality of different information are compounded in a single mode fiber, and this information is communicated therethrough.

Therefore, it is necessary to divide the composite lights into respective light beams depending on the wavelength channels thereof at the receiving station, to obtain the information loaded on the respective wavelength light beams.

In such a system, an optical wavelength compounding/dividing device is used for compounding the light beams having a plurality of wavelengths in a single mode fiber and for dividing the composite lights depending on the respective wavelengths.

2. Description of the Related Art

FIG. 8 is a side cross-sectional view of a conventional optical system for compounding/dividing light depending on an optical wavelength. Here, it is presumed that this system is used as a demultiplexer for dividing light beams.

This optical system is provided with an input optical fiber 21, a spectroscopic grating 22, an output fiber array 23, and a collimator lens 24. The light beam input from the optical fiber 21 is changed to parallel light beams by the lens 24 and reflected by the grating 22. The light beams diffracted on different wavelengths by the grating 22 are focused on the respective optical fibers of the output fiber array 23 arranged according to the respective wavelength channels and transmitted therethrough.

However, in a conventional optical system as mentioned above, there is an serious drawback in that the open regions of the output optical fiber core available for the respective wavelengths are relatively narrow, compared to the pitch between adjacent fibers of the output fiber array. Therefore, only light beams in the narrow wavelength region within a same wavelength band can be picked up by the output fibers.

FIGS. 9, 10, and 11 show another conventional optical system known in the prior art and disclosed in Japanese Unexamined Patent Publication No. 60-107004 and "Electronics Letters", Vol. 21, No. 10, page 423, 1985, by I. Nishi et al. This optical system is provided with an input optical fiber 31, a self-focusing lens 32, a spectroscopic grating 33, upper and lower rectangular prisms 34a and 34b, first and second output fibers 35a and 35b, and a glass block 36. FIG. 10 shows the relationship between the shift of the incident light position in accordance with the wavelength and the light beams emitted from the upper and lower rectangular prisms 34a and 34b. FIG. 11 schematically shows the change of light beam position due to the wavelength thereof.

The light input from the optical fiber 31 is changed to parallel light (FIG. 11a) by the self-focusing lens 32 and input via the glass block 36 to the grating 33 inclined by a predetermined angle. The light is diffracted by the grating 33 depending on the wavelength thereof (FIG. 11b). Diffracted light in a certain wavelength region, such as $\lambda_1$ to $\lambda_2$, is focused on the upper rectangular prism 34a and emitted in the opposite direction through the self-focusing lens 32. Next, the light is introduced to the grating 33 to be diffracted again and is then focused on the first output fiber 35a through the self-focusing lens 32. Similarly, light in another wavelength region, such as $\lambda_3$ to $\lambda_4$, is focused on the lower rectangular prism 34b and focused on the second output fiber 35b. Therefore, the positions of light beams emitted from upper and lower rectangular prisms 34a and 34b are as seen in FIG. 11c. Also, the positions of light beams focused on the first and second output fibers 35a and 35b are as seen in FIG. 11d.

This optical system makes it possible to broaden the bandwidth in respective wavelength channels, when compared with an optical device such as shown in FIG. 8. However, it would be difficult to increase the number of wavelength channels to realize a multi-channel optical device.

SUMMARY OF THE INVENTION

Accordingly, an object of the present invention is to provide an optical device for compounding/dividing light depending on the wavelength thereof, capable of overcoming the above-mentioned drawbacks.

Another object of the present invention is to provide an optical system capable of solving the problem wherein the wavelength band is narrowed due to wavelength dispersion in a spectroscopic grating by broadening the bandwidth in respective wavelength channels.

A further object of the present invention is to provide an optical system capable of increasing the number of wavelength channels to realize a multi-channel optical device.

According to the present invention, there is provided an optical device for compounding/dividing light depending on the optical wavelength thereof, comprising: optical input and output means, one of which means includes a single optical fiber and the other of which means includes an optical fiber array consisting of a plurality of optical fibers, the optical input and output means defining therebetween an optical path; first and second spectroscopic gratings disposed on the optical path; a dispersion-dividing element disposed on the optical path and between the first and second spectroscopic gratings; the dispersion-dividing element consisting of a plurality of step-like V-shaped grooves each having a predetermined-angled apex and two inclined surfaces, so that a light beam, the position of which is shifted depending on the wavelength, moves from groove to groove, and within the region of one groove, the light beam is reflected first at one of the inclined surfaces and then at the other inclined surface, to change the direction of the light beam.

The dispersion-dividing element can be replaced by a tetrahedral dispersion-dividing prism, one face of which defines a dispersion-dividing part consisting of a plurality of step-like V-shaped grooves, as mentioned above. In this case, only one spectroscopic grating is necessary. The prism is arranged such a manner that light beams incident upon and emitted from the prism are in parallel to each other but have opposite direction, so that the light beam incident upon the prism from the spectroscopic grating is emitted from the prism back to the grating.

BRIEF DESCRIPTION OF THE DRAWINGS

FIG. 4 is a schematic perspective view of a dispersion-dividing part of the prism shown in FIG. 3;

FIG. 4A is a schematic cross-sectional view illustrating the dispersion-dividing part of the prism shown in FIG. 4;

DESCRIPTION OF THE PREFERRED EMBODIMENTS

Figure 1:
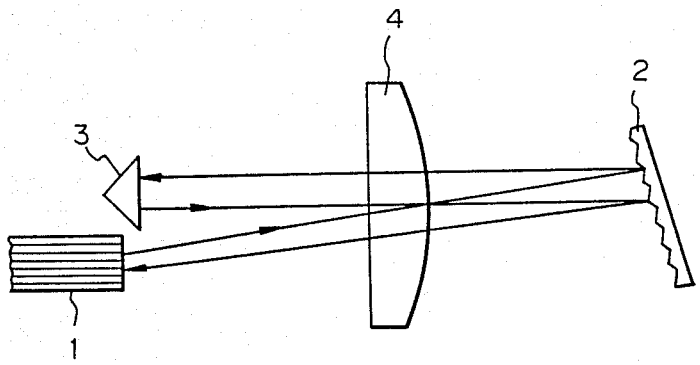
FIG. 1 is a side cross-sectional view of an embodiment of an optical system according to this invention.

Referring now to the drawing, FIG. 1 is a side cross-sectional view of an embodiment of an optical system, i.e., a multiplexer or demultiplexer, according to this invention, containing a diffraction grating and a "dispersion-dividing prism". In FIG. 1, this optical system is provided with light input and output fibers 1, a spectroscopic grating 2, a dispersion-dividing prism 3, and a collimator lens 4.

Figure 3:
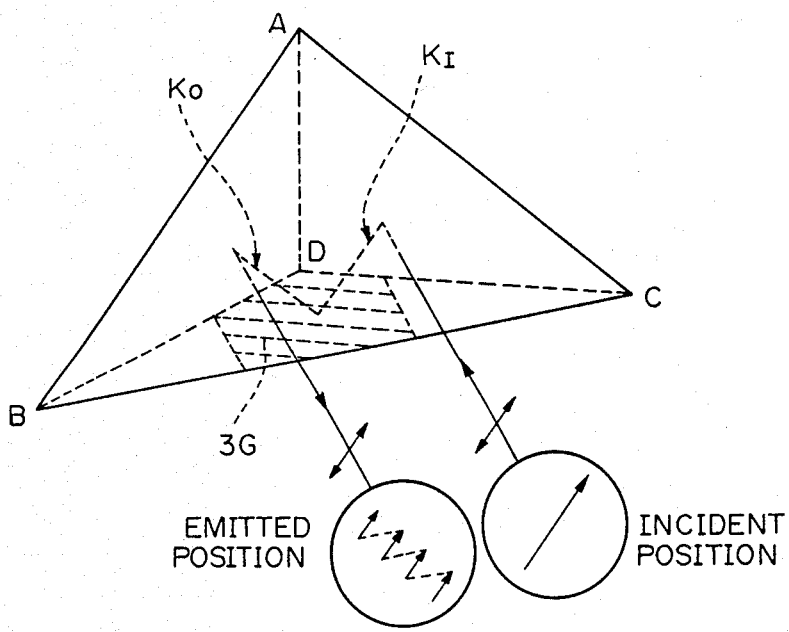
FIG. 3 is a perspective view of a tetrahedral dispersion-dividing prism used in this invention.

According to this invention and as illustrated in FIG. 3 arranged on an optical path from the input optical fiber(s) to the output optical fiber(s), is a dispersion-dividing prism 3 having a tetrahedral body: one face thereof includes a dispersion-dividing part 3G described hereinafter in detail. This prism 3 and the input and output fibers 1 are arranged in the vicinity of one of the focal planes of the lens 4, and the spectroscopic grating 2 is arranged in the vicinity of the other focal plane of the lens 4.

Briefly, in this invention, it is presumed that this optical system is used as a demultiplexer for dividing composite light into respective wavelengths. But, this system also can be used as a multiplexer for compounding the divided light and to transmit the compounded light through a single fiber.

In this demultiplexer, the light beam passes through the components of the demultiplexer from the input optical fiber in the following order: the collimator lens 4; the spectroscopic grating 2; the lens 4; the dispersion-dividing prism 3; the lens 4; the granting 2; and the lens 4. From the final passage through the lens 4 the light then passes to the output optical fibers.

Figure 2:
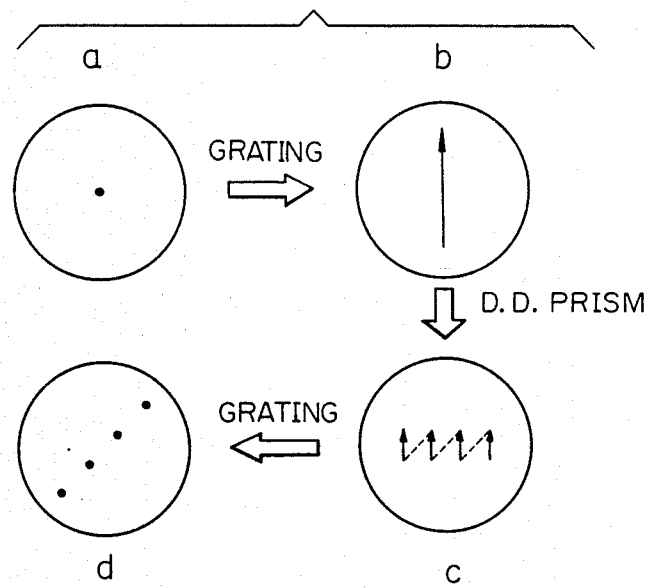
FIG. 2 shows the change of light beam position due to a wavelength thereof.

FIG. 2 shows the change in the position of the light beam due to its wavelength at the left-hand focal plane of the lens 4, along which the light beam is focused. A light beam from the input optical fiber (FIG. 2a) is first collimated and transformed into parallel light beams by the collimator lens 4, and then diffracted according to the wavelength thereof by the spectroscopic grating 2. The light beam is then focused along a line (arrow in FIG. 2b) by the lens 4. The point of focusing along this line depends on the wavelength of the light beam. This line, is in the dispersion-dividing prism 3, and is divided and rearranged into several transversely arrayed segments (FIG. 2c) by the dispersion-dividing prism 3, as shown in FIG. 3. This is the most important function of the dispersion-dividing prism 3 and is described hereinafter in detail. The light is again, collimated and made parallel by the lens 4 and again diffracted by the grating 2. In these processes, the two diffractions cancel each other out in the same segment. Therefore, the light passing through each segment is focused on a separate point (FIG. 2d) because the transverse shift produced by the dispersion-dividing prism 3 is maintained by the diffraction of the grating 2. As a result, the light is picked up by each output fiber.

FIG. 3 is a perspective view of the tetrahedral dispersion-dividing prism 3 used in the optical system of this invention. The tetrahedral body ABCD is constituted as follows. The incident/emission face ABC is a right-angled isosceles triangle having a right-angle BAC and is perpendicular to the light incident upon and emitted from the prism 3. The angle between the face ABC and the face BCD is 90°, and the angles between the faces ABD and ACD and the face ABC are both 45°. Therefore, the angles between the faces ABD and ACD and the face BCD are both 60°. Also, the angle between the face ABD and the face ACD is 120°. The face BCD of the prism 3 is formed as a dispersion-dividing part 3G, which performs the most important function according to the present invention, as described hereinafter in detail.

Figure 5:
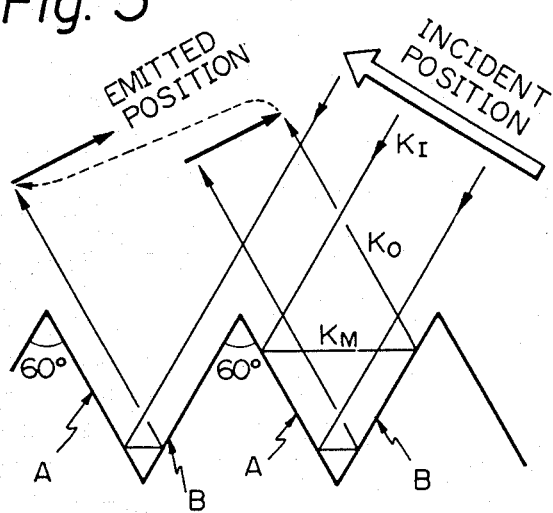
FIG. 5 is a cross-sectional view of a dispersion-dividing part of the prism having an apex of 60° and two inclined surfaces.

The incident light passes through the face ABC of the prism 3 and is totally reflected at the face ACD, thus changing the orientation thereof. The light incident and emitted angles at the face ACD are both 45°. The light is then totally reflected at the macroscopic face BCD (dispersion-dividing part 3G). The light incident and emitted angles at the macroscopic face BCD are both 45°. However, at this dispersion dividing part 3G, the light is totally reflected twice. In this operation, a continuous change of the position of the incident light, as shown in FIGS. 4, 4A and 5, is converted into a divided change of the position of the output light, as described hereinafter in detail. The light is then totally reflected at the face ABD. The incident and emitted angles at the face ABD are also both 45°. Thus, the light is emitted through the face ABC in the direction parallel to but opposite from that of the incident light.

In the prism 3, P-polarization and S-polarization total reflection is performed twice, i.e., total reflection is performed four times. Therefore, compensation of the phase difference of reflection due to the polarization is carried out and the condition of polarization at the time of input and output is maintained.

The dispersion-dividing part 3G formed on the face BCD of the prism 3 consists of a plurality of step-like V-shaped grooves, each having an apex with a 60° angle, and inclined surfaces A and B, as shown in FIGS. 4, 4A and 5. The V-grooves are in parallel to the side CD of the prism 3, i.e., at an angle of about 35.3° with respect to the side BC.

Here, it is presumed that, the rectangular coordinates of x, y, and z (FIG. 4), face x-z is parallel to the macroscopic face BCD and line x is in parallel to the side BD of the prism 3. Therefore, the above relationship can be expressed by showing that the V-grooves are in the macroscopic face x-z (face-y) and extend at an angle of about 35.3° to line x.

The orientations of the light incident upon and emitted from the face ABC of the prism 3 can be defined as follows:

Incident light: $-z$ direction
Emitted light: $z$ direction

The light (direction $x'$) incident upon the dispersion-dividing part 3G is parallel to the inclined surface B of the V-groove and input to the inclined surface A, as shown in FIG. 5. The light is reflected twice, i.e., first at the inclined surface A and then at the inclined surface B, and then output (direction $y'$) in parallel to the inclined surface A of the V-groove.

The orientations of $x'$ and $y'$ are defined as follows:
Orientation of $x'$: $(2^{-\frac{1}{2}}, 2^{-\frac{1}{2}}, 0)$
Orientation of $y'$: $(-2^{-\frac{1}{2}}, 2^{-\frac{1}{2}}, 0)$ Assuming that the incident light is $K_I$, the intermediate light between the two reflections is $K_M$, the emitted light is $K_O$, and the angle between the axis x and the direction of the V-groove is $\theta$, the dispersion-dividing part 3G must satisfy the following conditions:

(1) The macroscopic face on which the dispersion-dividing part is formed is y;
(2) Each V-groove has an apex having a 60° angle;
(3) $\theta = \text{Tan}^{-1}(2^{-\frac{1}{2}}) = 35.3°$;
(4) Orientation of $K_I$: $(2^{-\frac{1}{2}}, -2^{-\frac{1}{2}}, 0)$;
(5) Orientation of $K_M$: $(0, 0, 1)$; and
(6) Orientation of $K_O$: $(2^{-\frac{1}{2}}, 2^{-\frac{1}{2}}, 0)$.

The above conditions (2) and (3) also can be represented as (2)' and (3)', wherein the orientations of the inclined surfaces A and B of the V-grooves are defined as follows:

Inclined surface A: $(-2^{-1}, 2^{-1}, 2^{-\frac{1}{2}})$; and
Inclined surface B: $(2^{-1}, 2^{-1}, -2^{-\frac{1}{2}})$.

In this case, the orientation of each part is summarized as follows:

$K_I$: $(2^{-\frac{1}{2}}, -2^{-\frac{1}{2}}, 0)$
$K_M$: $(0, 0, 1)$
$K_O$: $(2^{-\frac{1}{2}}, 2^{-\frac{1}{2}}, 0)$
A: $(-2^{-1}, 2^{-1}, 2^{-\frac{1}{2}})$
B: $(2^{-1}, 2^{-1}, -2^{-\frac{1}{2}})$ In addition to satisfying the above conditions (1) through (6), this optical system must further satisfy the following conditions:

(7) The direction of the dispersion of the light emitted from the spectroscopic grating 2 (FIG. 1), which light is input to the prism 3 must be z; and
(8) The incident light must be focused on this dispersion-dividing part 3G.

Under the above-mentioned conditions, the dispersion-dividing part 3G according to the present invention operates in the following manner.

(1) The direction of the dispersion of the emitted light is perpendicular to the direction of z, i.e., the direction of $y'$.
(2) The incident angles of the two reflections are both 45°.
(3) The polarization of the Z-direction in the incident light is a P-polarization at the inclined surface A and an S-polarization at the inclined surface B, and therefore, becomes a polarization of the $y'$-direction when output.

(4) Similarly, the polarization of the $x'$-direction in the incident light becomes a polarization of the z-direction when output.

(5) If the position of the incident light input to the dispersion dividing part 3G shifts in the direction of $-z$, as shown in FIGS. 4 and 5, the position of the output light moves in the direction of $y'$ within a range of the same groove. If the position of the incident light further shifts in the direction of $-z$, to cross the groove boundary and be input to a region of the next V-groove, the position of output light becomes discontinuous, as shown in FIG. 5. As a result, the continuous change in the input position becomes a periodic change in the output position. The focusing point dispersed along a line by the grating 2 is thus rearranged into segments.

(6) Finally this dispersion-dividing part 3G can be located at the position of the lens focusing point within the range of the tolerance substantially corresponding to the depth of the V-groove.

Figure 6:
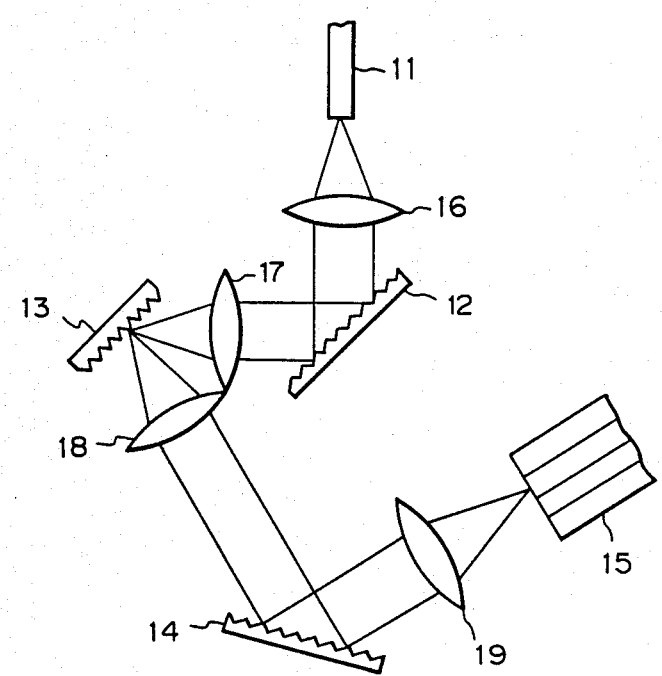
FIG. 6 is a side cross-sectional view of another embodiment of an optical system of this invention.
Figure 9:
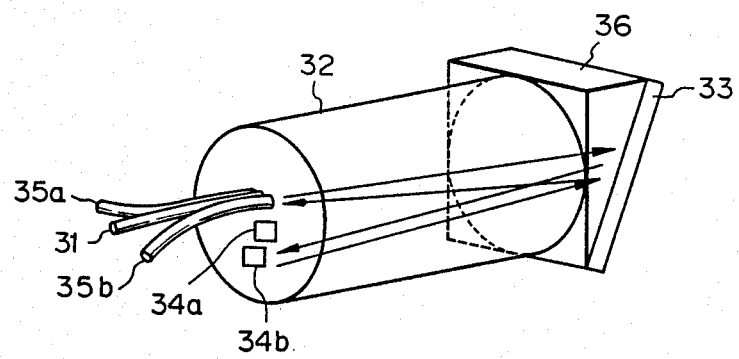
FIG. 9 is a perspective view of another known optical system using right-angled prisms.

FIG. 6 is a side cross-sectional view of another embodiment of an optical system according to this invention. This embodiment is provided with a light input optical fiber 11, a first spectroscopic grating 12, a "dispersion-dividing element" 13, a second spectroscopic grating 14, an output fiber array 15, and collimator lenses 16, 17, 18, and 19.

Arranged on a light path from the input optical fiber 11 to the output fiber array 15 are two spectroscopic gratings 12 and 14 having the same diffraction characteristics and a dispersion-dividing element 13 disposed between these two gratings 12 and 14. This dispersion-dividing element 13 consists of a plurality of step-like V-shaped grooves each having an apex having a 60° angle and inclined surfaces A and B, in the same manner as the face BCD of the prism 3 (FIG. 3) having a dispersion-dividing part 3G (FIGS. 4 and 5), as mentioned above.

The light incident upon the dispersion-dividing element 13 is parallel to the inclined surface B of the V-groove and input to the inclined surface A. The light is reflected twice, i.e., first at the inclined surface A and then at the inclined surface B, and then output in parallel to the inclined surface A of the V-groove. However, since this embodiment has no reflecting faces, such as ACD and ABD of the prism 3 (FIG. 3), the two spectroscopic gratings 12 and 14 are necessary. The collimator lenses 17 and 18 are located in such a manner that the light incident upon and emitted from the dispersion-dividing element 13 is focused thereon, respectively. Also, the collimator lenses 16 and 19 are located in such a manner that the light input from the input optical fiber 11 and output to the output fiber array 15 is focused thereon, respectively. The construction and functions of the dispersion-dividing element 13 are exactly the same as those of the dispersion-dividing part 3G of the prism 3 (FIG. 3).

Figure 7:
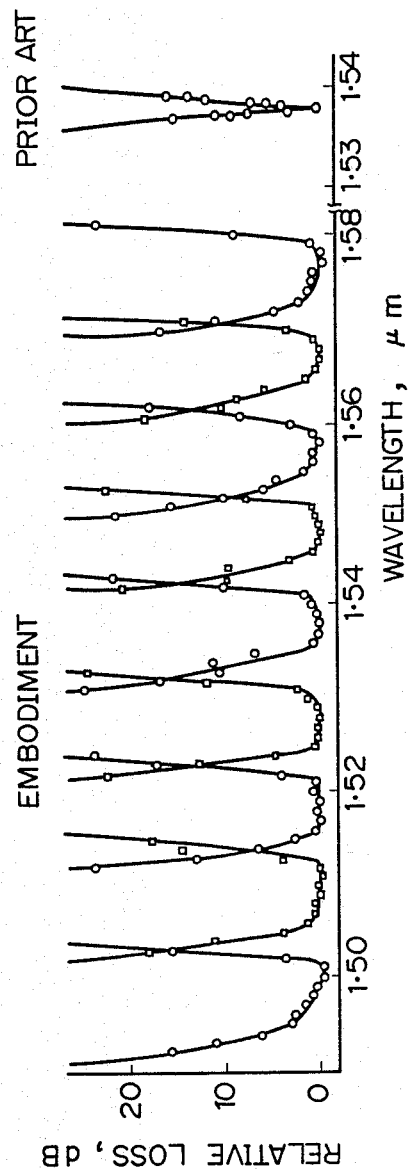
FIG. 7 shows light transmission loss characteristics, when comparing the optical system of this invention with a conventional system.
Figure 8:
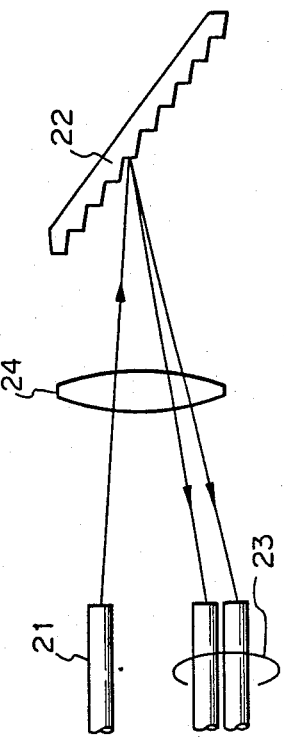
FIG. 8 is a side cross-sectional view of a typical conventional optical system.
Figure 10:
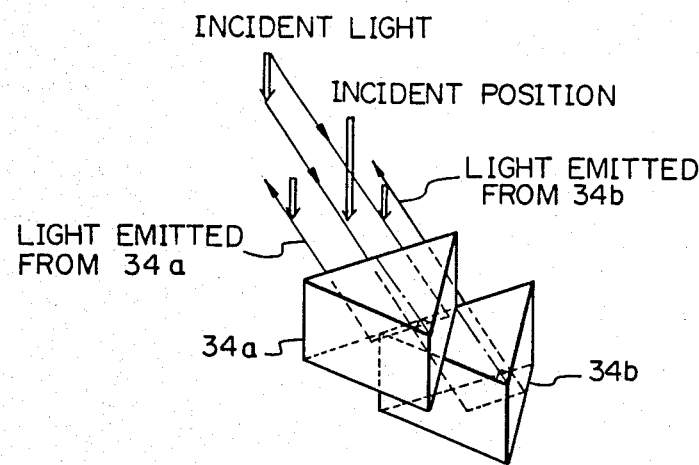
FIG. 10 is a schematic perspective view for illustrating the functions of the right-angled prisms used in the system shown in FIG. 9.
Figure 11:
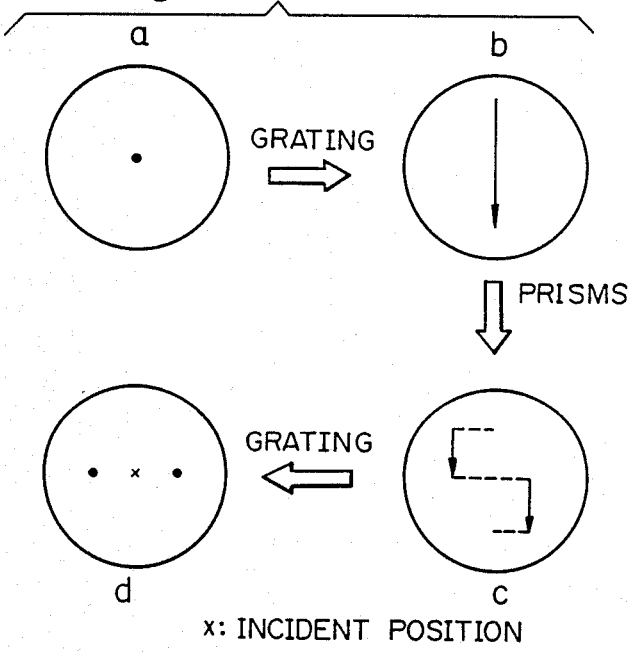
FIG. 11 shows the change of light beam position due to the wavelength in the known optical system shown in FIG. 9.

Using an optical system having a dispersion-dividing prism 3, as mentioned above with reference to the first embodiment, the inventors fabricated a nine-channel, single mode fiber multiplexer in the 1.55 $\mu$m wavelength region. In this multiplexer, the inventors used a 600 line/mm and 1.55 $\mu$m blaze grating and an f=20 mm lens, and obtained a channel spacing of 10 nm. FIG. 7 shows the measured relative transmission loss of each channel as a function of the wavelength. As will be understood from FIG. 7, bandwidths of 7 nm were obtained. The right most curve shows the results of a conventional optical system without a dispersion-dividing prism such as prism 3 or dispersion-dividing element such as dispersion-dividing element 13 (i.e., a conventional structure as mentioned with reference to FIG. 8). It is clear that the bandwidth can be remarkably broadened by the dispersion-dividing prism 3, and compared with the conventional structure, this multiplexer has an excess loss corresponding to one diffraction efficiency, which is about 0.5 dB.

I claim:

1. An optical device for compounding/dividing a light beam depending on an optical wavelength thereof, comprising:
    optical input and optical output means, one of said means including a single optical fiber and the other of said means including an optical fiber array having a plurality of optical fibers, said optical input and optical output means defining therebetween an optical path;
    first and second spectroscopic gratings disposed on said optical path;
    a dispersion-dividing element disposed on said optical path and between said first and second spectroscopic grating, said dispersion-dividing element having a face comprised of a plurality step-like V-shaped grooves each having an apex with a predetermined angle and first and second inclined surfaces, so that the light beam, the position of which is shifted depending on the wavelength thereof, moves from groove to groove, and within a region of one groove, the light beam is reflected first at one of the inclined surfaces and then reflected at the other surface so as to change the direction of the light beam.

2. An optical device as set forth in claim 1, further comprising means for collimating the light beam so that said light beam is focused on the face of said dispersion-dividing element.

3. An optical device as set forth in claim 2, wherein the apex of each of said V-shaped grooves has a 60° angle, so that when the light beam is incident upon said first inclined surface of said grooves the light beam is parallel to the second inclined surface and when the light beam is emitted from said second inclined surface of said grooves the light beam is parallel to said first inclined surface.

4. An optical device as set forth in claim 3, wherein, in rectangular coordinates of x, y, and z, the following conditions are satisfied:
    said face of said dispersion-dividing element is a y-axis face;
    an angle Θ is defined between an x-axis and the direction of said grooves so that $\Theta = \mathrm{Tan}^{-1}(2^{-\frac{1}{2}}) = 35.3°$ with respect to the x-axis;
    the orientation of the light beam incident upon said dispersion-dividing element is defined as $K_I = (2^{-\frac{1}{2}}, -2^{-\frac{1}{2}}, 0)$; and
    the light beam is diffracted by one of said spectroscopic gratings in such a manner that a position of the light beam incident upon said dispersion-dividing element is shifted in a direction of an z-axis, depending on the wavelength thereof.

5. An optical device for compounding/dividing a light beam depending on an optical wavelength thereof, comprising:
    optical input and optical output means, one of said means including a single optical fiber and the other of said means including an optical fiber array having a plurality of optical fibers, said optical input and optical output means defining therebetween an optical path;
    a spectroscopic grating disposed on said optical path; and
    a tetrahedral dispersion-dividing prism disposed on said optical path and having a first face defining a dispersion-dividing part including a plurality of step-like V-shaped grooves each having an apex having a predetermined angle and first and second inclined surfaces, so that the light beam, the position of which is shifted depending on the wavelength thereof, hits the first face, and within the region of each of the grooves, the light beam is reflected first at one of the inclined surfaces and then reflected at the other surface so as to change the direction of the light beam, said prism being arranged in such a manner that the light beam when emitted from said prism is parallel to the light beam when incident upon said prism and has opposite direction, so that the light beam incident upon the prism from said spectroscopic grating is emitted from the prism back to said grating.

6. An optical device as set forth in claim 5, further comprising means for collimating the light beam so that said light beam is focused on said first face which defines said dispersion-dividing part of the prism.

7. An optical device as set forth in claim 6, wherein the predetermined angle of each said apex of said V-shaped grooves is 60°, so that when incident upon said first inclined surface the light beam is parallel to the second inclined surface and when emitted from said second inclined surface the light beam is in parallel to said first inclined surface.

8. An optical device as set forth in claim 6, wherein said tetrahedral prism is defined as body ABCD and said body satisfies the following conditions:
    a face ABC, through which the light beam is incident upon and emitted from said prism, is a right isosceles triangle having a right angle BAC perpendicular to said light beam;
    said first face defining said dispersion-dividing part is face BCD;
    the angle between the faces ABC and BCD is 90°; and
    the angles between the face ABC and faces ABD and ACD are both 45°, and also, in rectangular coordinates of x, y, and z, in which the face BCD is a y-axis face and line segment BC is on an x-axis, the following conditions are satisfied:
    an angle Θ is defined between the x-axis and the direction of said grooves so that $\Theta = \mathrm{Tan}^{-1}(2^{-\frac{1}{2}}) = 35.3°$ with respect to the x-axis, and
    the light beam input to said prism is diffracted by said spectroscopic grating in such a manner that the position of the light beam incident upon said dispersion-dividing part shifts in a direction of the z-axis, depending on the wavelength thereof.

* * * * *